(12) United States Patent
Koo et al.

(10) Patent No.: US 7,489,666 B2
(45) Date of Patent: Feb. 10, 2009

(54) MEDIA ACCESS CONTROL APPARATUS AND METHOD FOR GUARANTEEING QUALITY OF SERVICE IN WIRELESS LAN

(75) Inventors: Ki Jong Koo, Daejeon (KR); Dae Hwan Hwang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 951 days.

(21) Appl. No.: 10/917,684

(22) Filed: Aug. 12, 2004

(65) Prior Publication Data

US 2005/0141548 A1 Jun. 30, 2005

(30) Foreign Application Priority Data

Dec. 26, 2003 (KR) ...................... 10-2003-0097155

(51) Int. Cl.
*H04J 3/00* (2006.01)
(52) U.S. Cl. ..................... 370/336; 370/332; 370/465
(58) Field of Classification Search ................. 370/462, 370/336, 332, 445, 465
See application file for complete search history.

(56) References Cited

U.S. PATENT DOCUMENTS

| 7,095,754 | B2 * | 8/2006 | Benveniste | 370/465 |
| 2002/0071413 | A1 | 6/2002 | Choi | |
| 2003/0072280 | A1 * | 4/2003 | McFarland et al. | 370/332 |
| 2004/0151144 | A1 * | 8/2004 | Benveniste | 370/336 |
| 2004/0170150 | A1 * | 9/2004 | Guo et al. | 370/338 |
| 2006/0045022 | A1 * | 3/2006 | Kneckt et al. | 370/252 |

OTHER PUBLICATIONS

"QoS Support MAC Technology for Wireless Home Networking" from *Korean Institute of Communication and Sciences* 2003, vol. 20-6, pp. 727-734, Abstract.
Sunghyun Choi: Seoul National University, "Emerging IEEE 802.11e WLAN for Quality-of-Service (QoS) Provisioning," SK Telecom Telecommunications Review, vol. 12, No. 6, 2002, pp. 894-906.

* cited by examiner

*Primary Examiner*—Chi H Pham
*Assistant Examiner*—Albert T Chou
(74) *Attorney, Agent, or Firm*—Blakely, Sokoloff, Taylor & Zafman

(57) ABSTRACT

The present invention relates to a media access control (MAC) apparatus and method for guaranteeing quality-of-service in a wireless local area network (LAN). The MAC method comprises: extracting a user priority from a frame received from an upper layer and separately storing a voice frame and a general frame according to an access category (AC); independently performing backoff operations for the voice frame and the general frame; determining whether the backoff operations for the voice frame and the general frame have simultaneously ended; if the backoff operations have simultaneously ended, transmitting the voice frame having a higher priority first and performing the backoff operation for the general frame; and if the backoff operations have not simultaneously ended, transmitting a frame whose backoff operation ends.

5 Claims, 5 Drawing Sheets

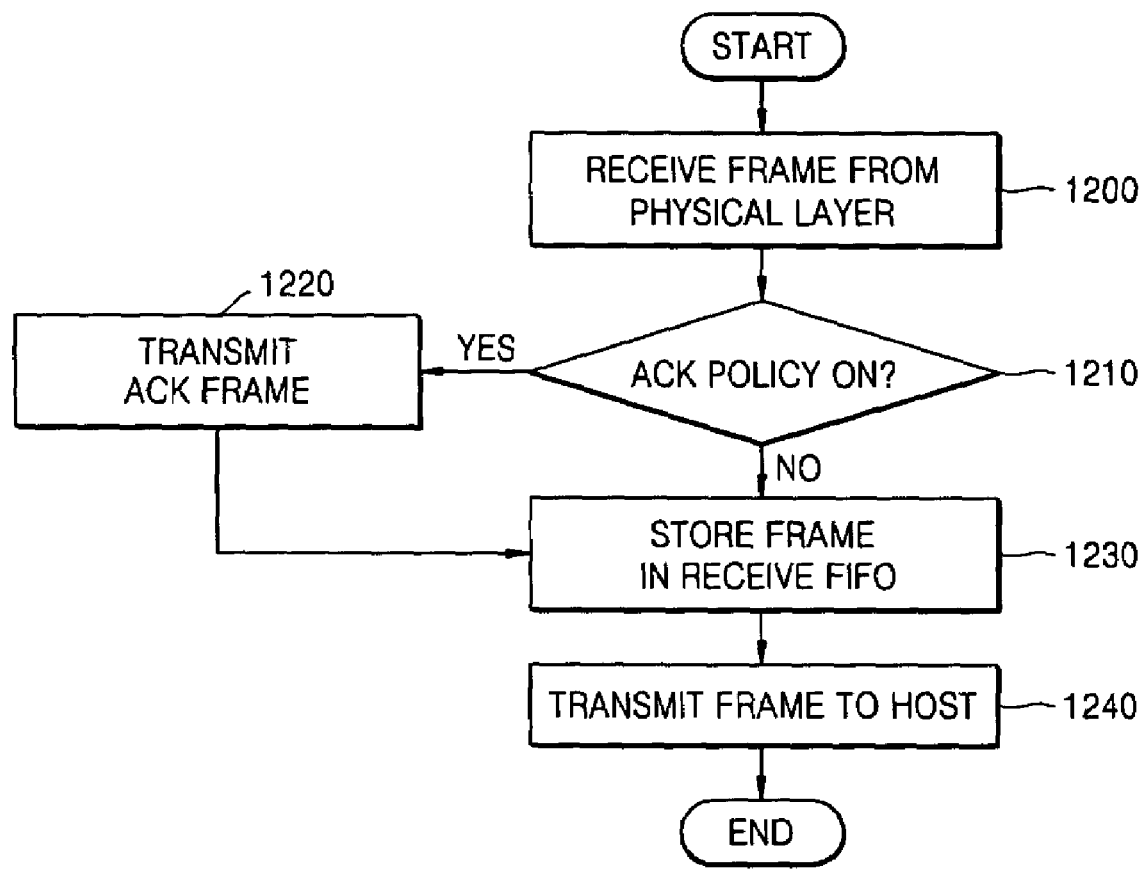

MEDIA ACCESS CONTROL APPARATUS AND METHOD FOR GUARANTEEING QUALITY OF SERVICE IN WIRELESS LAN

BACKGROUND OF THE INVENTION

This application claims the priority of Korean Patent Application No. 2003-97155, filed on Dec. 26, 2003, in the Korean Intellectual Property Office, the disclosure of which is incorporated herein in its entirety by reference.

1. Field of the Invention

The present invention relates to a quality-of-service technology for a communication system, and more particularly, to an apparatus and method for guaranteeing quality-of-service in a wireless local area network (LAN).

2. Description of the Related Art

A voice-over-Internet protocol (VOIP) technology represents an IP telecommunication technology used when a plurality of facilities transfer voice information using an IP. In general, the VoIP technology deals with not a conventional protocol based on circuit as used for a public switched telephone network (PSTN) but a protocol for sending voice information with a digital format in discontinuous packets. Therefore, since packet transmission is discontinuously achieved, it is difficult to guarantee quality-of-service (QoS).

The QoS of voice information must be guaranteed for VoIP services. Accordingly, an IEEE 802.11 wireless LAN media access control (MAC) technology has recently been suggested as a new LAN technology for guaranteeing the QoS.

However, the IEEE 802.11 MAC technology cannot support frames to which discriminated user priorities are applied. Basically, when a channel access right is granted, a distributed coordination function (DCF) provides the same proportional channel access right to all stations contending for channels in a basic service set (BSS). However, the same proportional channel access right is not preferable for stations having different user priorities. Therefore, from the point of view of the QoS, the MAC technology must discriminately deal with frames having different priorities and provide a QoS field included in a frame header.

To provide these functions, an enhanced distribution coordination function (EDCF) has been included in an IEEE 802.11e standard work. The EDCF provides a discriminated distribution channel directly to each frame having 8 user priorities. The 8 user priorities are mapped to 4 access categories (ACs), and an IEEE 802.11e station must realize all of the 4 ACs.

However, when a terminal for the VoIP is realized, since the terminal can be sufficiently realized with an AC for a voice frame and an AC for a general use, a method of effectively using the ACs without realizing all the 4 ACs is necessary.

SUMMARY OF THE INVENTION

The present invention provides a media access control (MAC) apparatus for guaranteeing quality-of-service (QoS) in a wireless local area network (LAN), which can guarantee the QoS of VoIP services with a relatively simple method in a wireless LAN environment, and a method thereof.

According to an aspect of the present invention, there is provided a media access control (MAC) apparatus comprising: a first transmission queue storing a voice transmission frame; a second transmission queue storing a general transmission frame; a frame handler extracting user priority information from a frame input from an upper layer, mapping the frame to a relevant access category (AC), and storing the frame in the first transmission queue or the second transmission queue; a MAC controller determining a backoff operation timing and a frame transmission timing by checking a media status; a first arbitration inter-frame space (AIFS) timer and a second AIFS timer, each reducing a predetermined timer value set by the MAC controller by a predetermined value unit; a first backoff block and a second backoff block, each performing a separate backoff operation for each AC using a predetermined backoff count value; a contention resolution unit, which transmits the voice frame having a higher user priority first and gives up transmission of the general frame when two ACs simultaneously end the backoff operations; a frame detector, which determines whether or not to transmit ACK by checking an ACK policy bit from a header of the received frame when a frame is received from a physical layer; and a receive queue storing the received frame and transmitting the frame to the upper layer.

According to another aspect of the present invention, there is provided a media access control (MAC) method comprising: extracting a user priority from a frame received from an upper layer and separately storing a voice frame and a general frame according to an access category (AC); independently performing backoff operations for the voice frame and the general frame; determining whether the backoff operations for the voice frame and the general frame have simultaneously ended; if the backoff operations have simultaneously ended, transmitting the voice frame having a higher priority first and performing the backoff operation for the general frame; and if the backoff operations have not simultaneously ended, transmitting a frame whose backoff operation ends.

According to another aspect of the present invention, there is provided a media access control (MAC) method comprising: receiving a frame from a physical layer; decoding an ACK policy from a header of the frame and determining whether or not to perform an ACK response based on the decoded ACK policy; when the ACK response must be performed, transmitting an ACK frame and storing the received frame in a receive queue; and when a host is ready, transmitting the frame to an upper layer regardless of a priority.

BRIEF DESCRIPTION OF THE DRAWINGS

The above and other features and advantages of the present invention will become more apparent by describing in detail exemplary embodiments thereof with reference to the attached drawings in which:

FIGS. 4 and 5 are flowcharts illustrating methods of supporting QoS in a wireless LAN, which are performed in the MAC apparatus shown in FIG. 3, according to exemplary embodiments of the present invention.

DETAILED DESCRIPTION OF THE INVENTION

Hereinafter, the present invention will now be described more fully with reference to the accompanying drawings, in which embodiments of the invention are shown.

Figure 1:
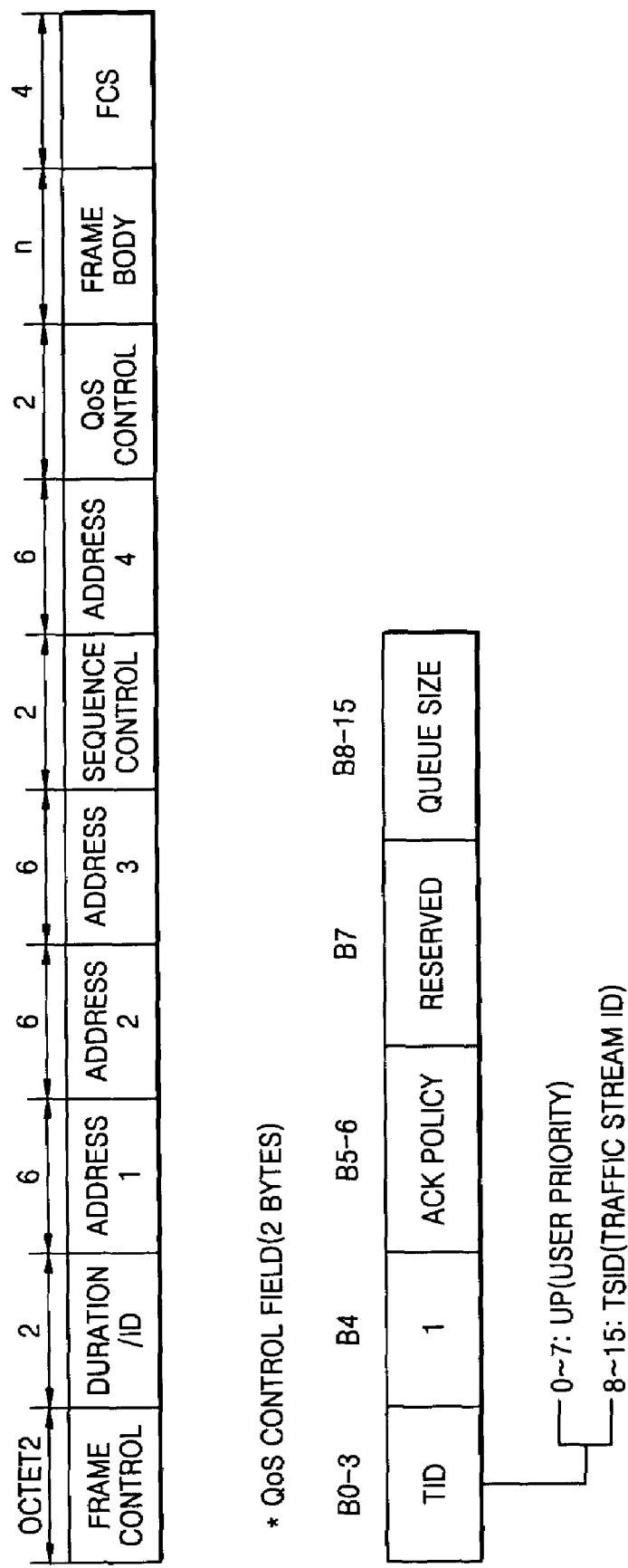
FIG. 1 illustrates configurations of a header of a MAC frame and a QoS control field included in the header of the MAC frame.
Figure 2:
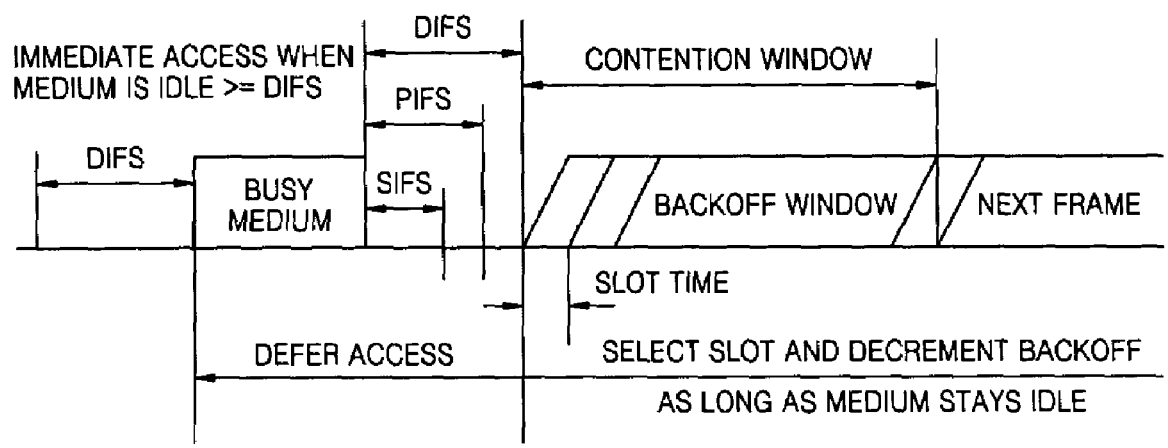
FIG. 2 illustrates a procedure for performing an IEEE 802.11 DCF.

FIG. 1 illustrates configurations of a header of a MAC frame and a QoS control field included in the header of the MAC frame. FIG. 2 illustrates a procedure for performing an IEEE 802.11 DCF.

An IEEE 802.11 MAC is based on a logic function called a coordination function. The coordination function determines whether a station transmits or receives a frame in a basic service set (BSS). The coordination function is divided into two functions, such as a distribution coordination function (DCF) based on a contention method and a point coordination function (PCF) based on a poll-response method, according to a method of obtaining a channel access right. Today, most 802.11 apparatuses operate using the DCF.

The 802.11 DCF operates with one transmission queue and is located in a distributed MAC having a local evaluation function with which a channel status can be evaluated in order to support a carrier sense multiple access collision avoidance (CSMA/CA) protocol.

Referring to FIG. 1, since a QoS control field is included in a header of a MAC frame, one of a plurality of priority values can be carried in the QoS control field. If a host or a router sending traffic to a LAN grants an appropriate priority for an individual packet to be transmitted, LAN devices, such as switches, bridges, and hubs, appropriately deal with the packet.

Referring to FIG. 2, if a channel is busy when a frame arrives in a transmission queue from an upper layer, after a MAC apparatus waits until a medium is idle, the MAC apparatus waits during a DCF inter-frame space (DIFS) time. If the channel is still idle after the DIFS time lapses, the MAC apparatus performs a backoff operation (transmission wait and try) to obtain a channel access right using a random backoff counter.

If the medium is idle during every slot time, the MAC apparatus decreases a random backoff count value, and if the count value becomes 0, the MAC apparatus transmits the frame. If the transmission queue is empty and the channel is idle for longer than the DIFS time when a frame arrives in the transmission queue, the MAC apparatus immediately transmits the frame without the backoff operation. If the channel becomes busy during the backoff operation, the MAC apparatus stops the backoff operation, and if the channel is continuously idle during the DIFS time, the MAC apparatus performs the backoff operation from the last backoff count value again.

Each station maintains a contention window (CW), which uses the random backoff count value. The backoff count value is a pseudo random integer selected with an even probability in a range of [0, CW]. The CW is initialized to CWmin and increases by CW=2(CW+1)−1 whenever transmission fails. This is a method for reducing a collision proportion when a plurality of stations try to transmit. The CW is set to at most CWmax, and after frame transmission normally ends, the CW is initialized to CWmin. Also, even if a frame waiting for transmission is not in the transmission queue, a station, which has transmitted all data, waits during the DIFS time, performs the backoff operation, and ends a transmission process.

If a station successfully receives a frame, after a short inter-frame space (SIFS) time lapses, the station indicates that it has received the frame by immediately transmitting an ACK frame. If a station does not receive the ACK frame after transmitting data, the station performs retransmission after the random backoff operation.

As described above, in the IEEE 802.11 MAC apparatus, if the MAC apparatus includes only one transmission queue, since a subsequent frame can be transmitted only after the transmission of a preceding frame ends, when the transmission of the preceding frame is delayed, it is difficult to guarantee QoS. This problem can be solved with a plurality of queues. The IEEE 802.11e standard recommends more than 4 classes of queues in a case of an access point (AP) supporting a point-to-multipoint access. However, the recommendation is not suitable for VoIP terminals.

Also, the DCF of the IEEE 802.11 MAC standard uses DIFS, CWmin, and CWmax, in which priorities are not considered. Since the MAC standard performs the backoff operation during a relatively long time for a frame requiring QoS, it is difficult to guarantee the QoS.

Also, since the DCF of the IEEE 802.11 MAC standard ends a frame transmission process only if an ACK response is received with respect to all data and a management frame, the DCF is not suitable for a frame requiring QoS in which transmission timing is more important than transmission quality. This problem can be solved by limiting the ACK response for a frame for which the QoS is required.

Therefore, in an embodiment of the present invention, to solve a QoS problem of a terminal supporting a VoIP service with two classes of transmission queues, for real-time traffic such as an access category 3 (AC-3), a queue for VoIP exclusive use is used, an AIFS[3] parameter, a CWmin[3] parameter, and a CWmax[3] parameter are used to guarantee a higher priority, and an ACK response in response to a transmitted VoIP frame is not received. For general traffic, to support priorities of all frames except the VoIP frame, an AIFS[AC] parameter, a CWmin[AC] parameter, and a CWmax[AC] parameter are used according to the AC, and an ACK response may be received or not. A configuration of a MAC apparatus having the features described above will now be described.

Figure 3:
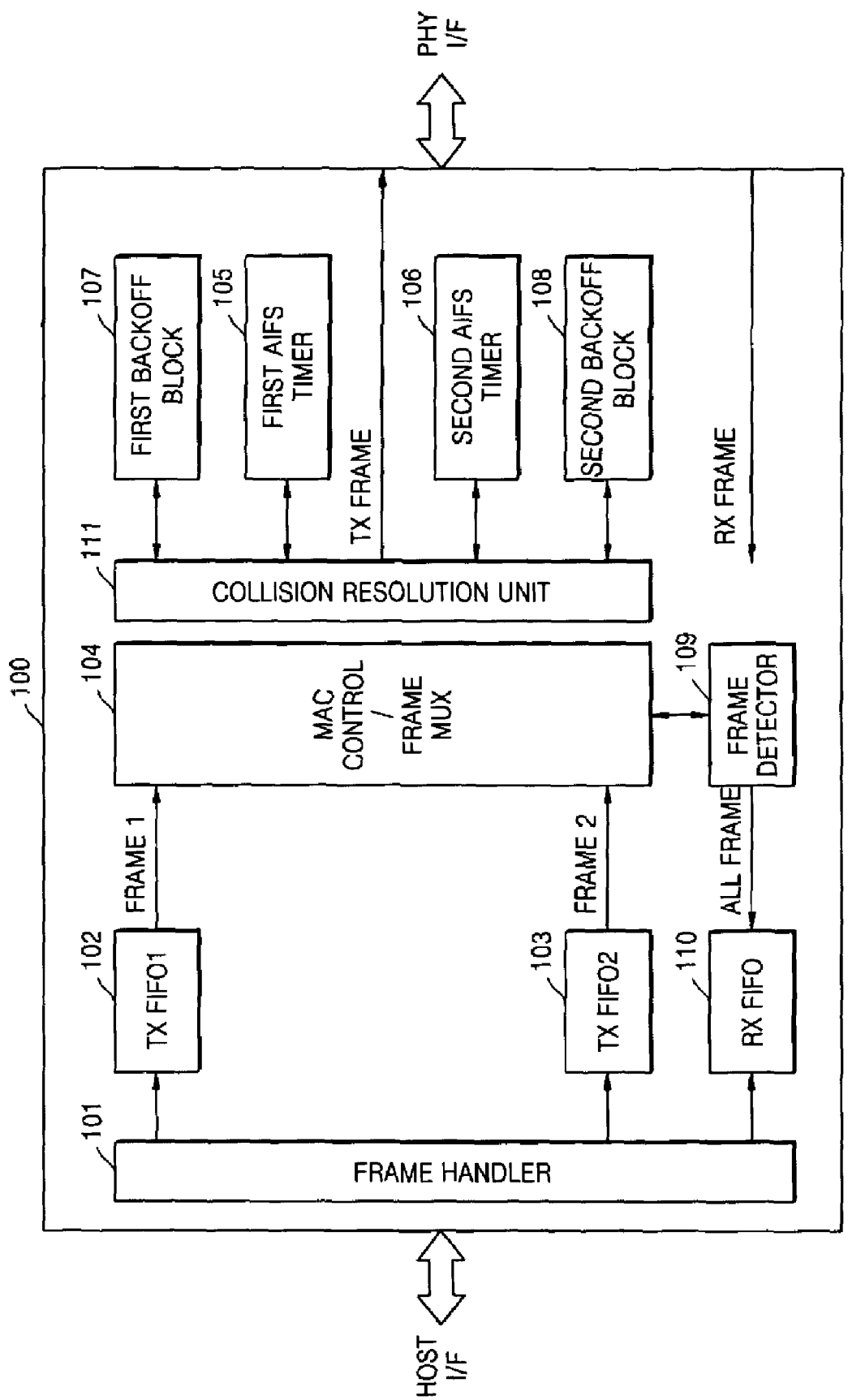
FIG. 3 is a block diagram of a MAC apparatus for supporting QoS in a wireless LAN according to an exemplary embodiment of the present invention.

FIG. 3 is a block diagram of a MAC apparatus 100 for supporting QoS in a wireless LAN according to an exemplary embodiment of the present invention. The MAC apparatus 100 is an IEEE 802.11 wireless LAN MAC apparatus 100 suitable for a terminal supporting a VoIP service.

Referring to FIG. 3, the MAC apparatus 100 includes a frame handler 101, first and second transmission queues 102 and 103, a MAC controller 104, first and second arbitration inter-frame space (AIFS) timers 105 and 106, first and second backoff blocks 107 and 108, a frame detector 109, a receive queue 110, and a collision resolution unit 111. Here, the first transmission queue 102 is composed of a voice frame transmission first-in-first-out (FIFO), and the second transmission queue 103 is composed of a general frame transmission FIFO. The receive queue 110 is also composed of a FIFO.

When a frame is received from an upper layer, the frame handler 101 extracts user priority (UP) information from a traffic ID (TID) included in a QoS control field (refer to FIG. 1) of a frame header, and if the frame is a voice frame, the frame handler 101 maps the frame to AC[3], and if the frame is a general frame, the frame handler 101 maps the frame to AC[0]-AC[2]. Also, if the frame is a voice frame, the frame handler 101 stores the frame in the first transmission queue 102, which is the voice frame exclusive transmission FIFO, and if the frame is a general frame, the frame handler 101 stores the frame in the second transmission queue 103, which is the general frame transmission FIFO.

If it is determined by the frame handler 101 that the AC is 3 and a voice frame transmission request is generated, the MAC controller 104 checks a medium status and determines a backoff operation timing and a frame transmission timing. Also, when the frame transmission request is generated, if the medium is busy, the MAC controller 104 waits until the medium is idle and sets the first and second AIFS timers 105 and 106 to an SIFS+AIFS[3] slot time according to the AC[3]. If the frame is a voice frame, a set value of the first AIFS timer 105 is the same as a value of a priority inter-frame space (PIFS).

Each of the timers 105 and 106 is a timer for reducing the set value (SIFS+AIFS[3] slot time) in units of 1 μs. If the medium is still idle after the timer value becomes 0, the MAC controller 104 commands a relevant backoff block to perform a backoff operation on the frame. If two frames having different ACs are in the first and second transmission queues 102 and 103, respectively, and if separate frame transmission requests are generated, the MAC controller 104 commands the first and second backoff blocks 107 and 108 to independently perform backoff operations on the two frames.

Each of the first and second backoff blocks 107 and 108 uses a pseudo random integer evenly distributed in a range of [0, CW] as a backoff count value. At this time, the CW is initialized with CWmin[AC] and increases by CW=2(CW+1)-1 whenever frame transmission fails. The CW has CWmax[AC] as a maximum value, and even if frame transmission fails, the CW does not increase more than CWmax[AC]. Each of the first and second backoff blocks 107 and 108 starts a backoff operation using a backoff count value selected by the method described above, decreases a random backoff count value in every slot time in which the medium is idle while performing the backoff operation, and informs the MAC controller 104 of the end of the backoff operation if the random backoff count value becomes 0.

If the MAC controller 104 is informed of the end of the backoff operation, the MAC controller 104 transmits a frame of the AC for which the backoff operation is performed to a physical layer. At this time, if two ACs simultaneously end the backoff operations, the collision resolution unit 111 transmits a voice frame having a higher UP first and gives up transmission of other general frames. The collision resolution unit 111 commands the second backoff block 108 to perform the backoff operation again using an increased CW value for the other general frame.

Also, when a transmission request is generated, if the medium is in a waiting status during the AFIS[AC] or performing the backoff operation, the MAC controller 104 waits until the medium is idle. When the medium is idle, the MAC controller 104 sets one of the first and second AIFS timers 105 and 106 to an AIFS timer value according to an AC value and waits until the AIFS timer value becomes 0. If the medium is still idle after the AFIS[AC] time lapses, the MAC controller 104 starts a backoff operation by selecting one of the first and second backoff blocks 107 and 108. If the medium is idle during every slot time while performing the backoff operation, the MAC controller 104 decreases a random backoff count value. If the random backoff count value becomes 0, the MAC controller 104 transmits a frame.

Also, when a transmission request is generated, if the medium is idle for a longer time than the AFIS[AC] time, the MAC controller 104 immediately transmits a frame.

When a frame is received from the physical layer, the frame detector 109 determines whether or not to transmit an ACK frame by checking an ACK policy bit (refer to FIG. 1) included in the QoS control field of the frame header. However, the ACK frame is not transmitted if the received frame is a voice frame.

Also, if the received frame is a beacon frame transmitted from the AP, the frame detector 109 extracts parameters related to the QoS (For example, AIFS[AC], CWmin[AC], and CWmax[AC]) and updates existing values.

The receive queue 110 is composed of one FIFO, stores a frame, and transmits a relevant frame to the upper layer whatever UPs of received frames are.

Figure 4:
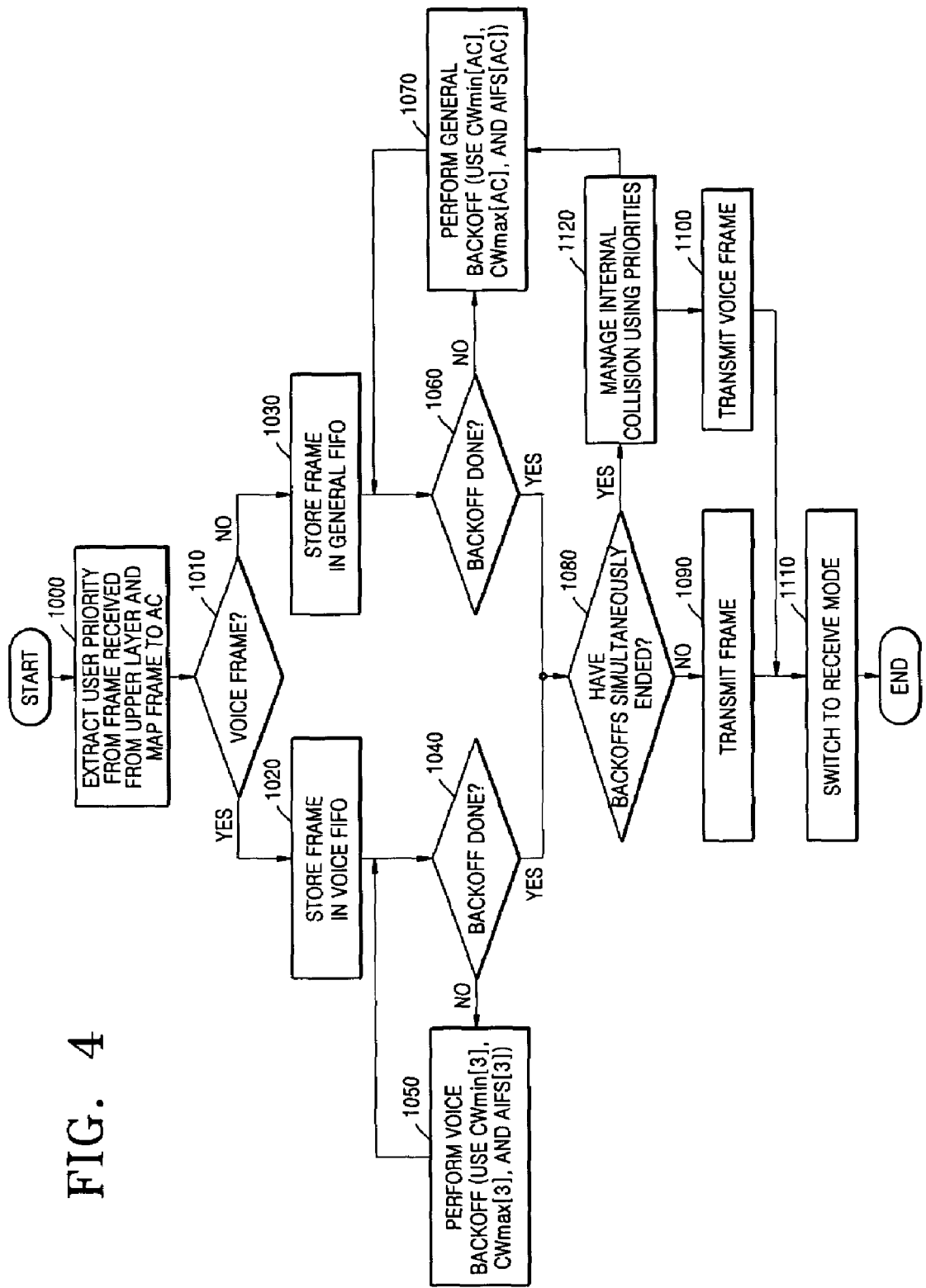

FIGS. 4 and 5 are flowcharts illustrating methods of supporting QoS in a wireless LAN, which are performed in the MAC apparatus 100 shown in FIG. 3, according to exemplary embodiments of the present invention. FIG. 4 illustrates a processing method of the MAC apparatus 100, that is performed in response to a frame received from an upper layer, and FIG. 5 illustrates a processing method of the MAC apparatus 100, that is performed in response to a frame received from a physical layer.

First, referring to FIG. 4, the MAC apparatus 100 determines a user priority (UP) of a frame input from an upper layer and maps the frame to an access category (AC) in step 1000. The MAC apparatus 100 determines whether the input frame is a voice frame in step 1010.

If the input frame is a voice frame corresponding to an AC[3] in step 1010, the MAC apparatus 100 stores the frame in the first transmission queue 102, which is a voice exclusive FIFO, in step 1020. If the input frame is a general frame corresponding to one of AC[0]-AC[2] in step 1010, the MAC apparatus 100 stores the frame in the second transmission queue 103, which is a general FIFO, in step 1030.

After the voice frame is stored in the first transmission queue 102 in step 1020, it is determined whether a backoff operation has ended in step 1040, and if the backoff operation has not ended in step 1040, the MAC apparatus 100 performs the backoff operation of the voice frame using CWmin[3], CWmax[3], and AIFS[3] in step 1050. It is determined whether a backoff operation has ended again in step 1040, and if the backoff operation has ended, the MAC apparatus 100 performs step 1080.

On the other hand, after the general frame is stored in the second transmission queue 103 in step 1030, it is determined whether a backoff operation has ended in step 1060, and if the backoff operation has not ended in step 1060, the MAC apparatus 100 performs the backoff operation of the general frame using CWmin[AC], CWmax[AC], and AIFS[AC] according to the AC in step 1070. It is determined whether a backoff operation has ended again in step 1060, and if the backoff operation has ended, the MAC apparatus 100 performs step 1080.

It is determined whether the backoff operations of the voice frame and the general frame have simultaneously ended in step 1080. If a single backoff operation ends in step 1080, the MAC apparatus 100 transmits the frame whose backoff operation ends regardless of priority in step 1090, and when the frame transmission ends, the MAC apparatus 100 switches to a receive mode in step 1110.

If it is determined that the backoff operations has simultaneously ended in step 1080, the MAC apparatus 100 performs internal collision management to which the priority is applied in step 1120. That is, the MAC apparatus 100 transmits the voice frame first by applying the priority to the internal collision management in step 1100 and allows the backoff operation to be performed by increasing a backoff count in step 1070. When the frame transmission ends, the MAC apparatus 100 switches to the receive mode in step 1110.

The processing method of the MAC apparatus 100 in response to a frame received from a physical layer will now be described with reference to FIG. 5.

Referring to FIG. 5, the MAC apparatus 100 receives a frame from a physical layer in step 1200. The MAC apparatus 100 decodes an ACK policy from a header of the received frame and determines whether an ACK response is performed using the ACK policy in step 1210. However, the ACK response is not performed if the received frame is a voice frame. If the ACK response must be performed as a result determined in step 1210, the MAC apparatus 100 transmits the ACK response in step 1220 and stores the received frame in the receive queue 110 in step 1230. When a host is ready, the MAC apparatus 100 transmits the frame to the upper layer regardless of priority in step 1240.

As described above, in a MAC apparatus and method for guaranteeing QoS in a wireless LAN according to embodiments of the present invention, for a real-time traffic VoIP such as an AC-3, a VoIP exclusive queue is used (refer to the reference number 102 of FIG. 3), and a back operation is performed using AIFS[3], CWmin[3], and CWmax[3] parameters corresponding to the AC-3 to guarantee a higher priority. For simultaneously generatable non-real-time traffic, a backoff operation is performed using AIFS[AC], CWmin[AC], and CWmax[AC] parameters according to the AC to support all priorities except the VoIP traffic. Also, when the back operations are simultaneously ended by the two transmission requests that are simultaneously generated, QoS is guaranteed by transmitting the VoIP traffic having a higher priority first.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to a MAC configuring method for guaranteeing QoS in a wireless LAN according to an embodiment of the present invention, a wireless LAN MAC, in which functions are simplified while guaranteeing QoS of a VoIP service, can be provided. Therefore, it becomes easy to manufacture commercial chip with low costs, and a terminal supporting a wireless VoIP service with a low price can be mass-produced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A media access control (MAC) apparatus comprising:
a first transmission queue exclusively storing a voice transmission frame;
a second transmission queue storing a general transmission frame and not storing voice transmission frames;
a frame handler extracting user priority information from a frame input from an upper layer, mapping the frame to a relevant access category (AC), and storing the frame in the first transmission queue or the second transmission queue;
a MAC controller determining a backoff operation timing and a frame transmission timing by checking a media status;
a first arbitration inter-frame space (AIFS) timer and a second AIFS timer, each reducing a predetermined timer value set by the MAC controller by a predetermined value unit;
a first backoff block and a second backoff block, each performing a separate backoff operation for each AC using a predetermined backoff count value;
a contention resolution unit, which transmits the voice frame having a higher user priority first and gives up transmission of the general frame when two ACs simultaneously end the backoff operations;
a frame detector, which determines whether or not to transmit an acknowledgment (ACK) frame by checking an ACK policy bit from a header of the received frame when a frame is received from a physical layer;
a receive queue storing the received frame and transmitting the frame to the upper layer; and
wherein the apparatus flexibly receives an ACK response based on the determination by the frame detector whether or not to transmit the ACK frame, but does not receive the ACK response if the received frame is the voice frame,
wherein the frame handler maps the received frame to an AC[3] when the received frame is a voice frame and to one of AC[0]-AC[2] when the received frame is a general frame,
wherein the MAC controller performs
i) the backoff operation by using an AIFS time (AIFS[3]) allocated to the AC[3] and an initial value (CWmin[3]) and a maximum value (CWmax[3]) of a contention window allocated to the AC[3] as Qos parameters for real-time traffic including the voice frame, and
ii) the backoff operation by using an AIFS time (AIFS[AC]) allocated according to the AC and an initial value (CWmin[AC]) and a maximum value (CWmax[AC]) of a contention window allocated according to the AC as Qos parameters to support all priorities except the real-time traffic for non-real-time traffic that can be simultaneously generated with the real-time traffic.

2. The apparatus of claim 1, wherein the first transmission queue is a voice-over-IP (VOIP) exclusive first-in-first-out (FIFO) for transmitting a voice frame, and
the second transmission queue is a general FIFO for transmitting a general frame.

3. The apparatus of claim 1, wherein the MAC controller starts the backoff operation by controlling the first and second backoff blocks if the medium is in an idle or waiting status after a predetermined AIFS time lapses since a transmission request was generated, decreases the backoff count value in every slot time in which the medium is in an idle status while performing the backoff operation, and ends the backoff operation if the backoff count value becomes 0.

4. The apparatus of claim 1, wherein each of the first and second backoff blocks uses a pseudo random integer among values evenly distributed between 0 and a contention window as the backoff count value, and the contention window has an initial value and a maximum value defined according to the AC.

5. A media access control (MAC) method comprising:
extracting a user priority from a frame received from an upper layer and storing a voice frame exclusively in a first queue and separately storing a general frame in a second queue according to an access category (AC);
independently performing backoff operations for the voice frame and the general frame;
determining whether the backoff operations for the voice frame and the general frame have simultaneously ended;
if the backoff operations have simultaneously ended, transmitting the voice frame having a higher priority first and performing the backoff operation for the general frame;
if the backoff operations have not simultaneously ended, transmitting a frame whose backoff operation ends; and
wherein an acknowledgment (ACK) response is flexibly received based on a determination of whether or not to transmit an ACK frame, but the ACK response is not received if the received frame is the voice frame, checking an ACK policy bit from a header of the received frame when the frame is received from a physical layer;

storing the receive frame and transmitting the frame to the upper layer;

mapping the received frame to an AC[3] when the frame is a voice frame and to one of AC[0]-AC[2] when the received frame is a general frame, wherein the MAC method performs i) the backoff operation by using an AIFS time (AIFS[3]) allocated to the AC[3] and an initial value (CWmin[3]) and a maximum value (CWmax[3]) of a contention window allocated to the AC[3] as Qos parameters for real-time traffic including the voice frame, and ii) the backoff operation by using an AIFS time (AIFS[AC]) allocated according to the AC and an initial value (CWmin[AC]) and a maximum value (CWmax[AC]) of a contention window allocated according to the AC as Qos parameters to support all priorities except the real-time traffic for non-real-time traffic that can be simultaneously generated with the real-time traffic.

* * * * *